Figure 1:
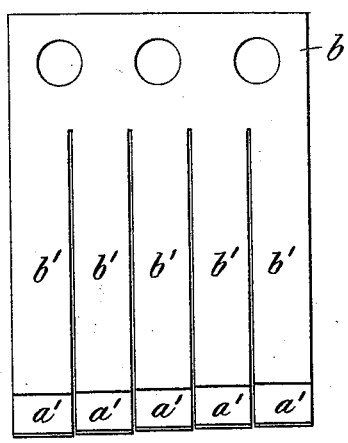

(No Model.) 7 Sheets—Sheet 1.

J. H. DALES.
AUTOMATIC ADJUSTMENT FOR BRASSES.

No. 544,213. Patented Aug. 6, 1895.

Witnesses:
G. W. Rea
Thos. A. Green

Inventor:
John H. Dales
By James L. Norris
Atty.

(No Model.)  7 Sheets—Sheet 2.

J. H. DALES.
AUTOMATIC ADJUSTMENT FOR BRASSES.

No. 544,213.  Patented Aug. 6, 1895.

Witnesses:
G. W. Rea
Thos. A. Green

Inventor:
John H. Dales,
By James L. Norris.
Atty.

(No Model.) 7 Sheets—Sheet 3.

J. H. DALES.
AUTOMATIC ADJUSTMENT FOR BRASSES.

No. 544,213. Patented Aug. 6, 1895.

Witnesses:
G. W. Rea,
Thos. A. Green

Inventor:
John H. Dales
By James L. Norris
atty (No Model.)

J. H. DALES,
AUTOMATIC ADJUSTMENT FOR BRASSES.

No. 544,213. Patented Aug. 6, 1895.

7 Sheets—Sheet 4.

Witnesses:
G. W. Rea.
Thos. A. Green

Inventor:
John H. Dales,
By James L. Norris.
Atty.

(No Model.) 7 Sheets—Sheet 5.
J. H. DALES.
AUTOMATIC ADJUSTMENT FOR BRASSES.
No. 544,213. Patented Aug. 6, 1895.
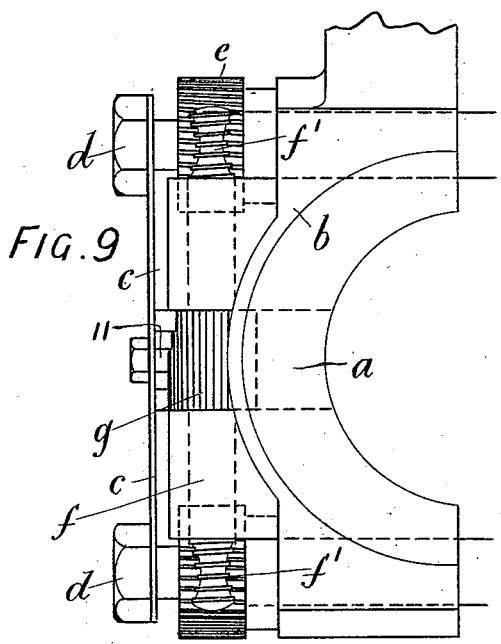
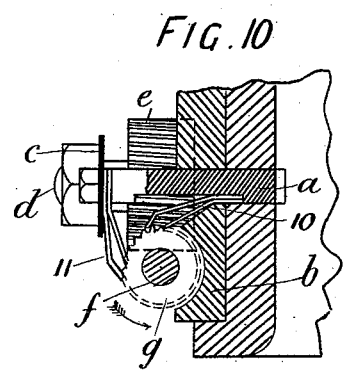
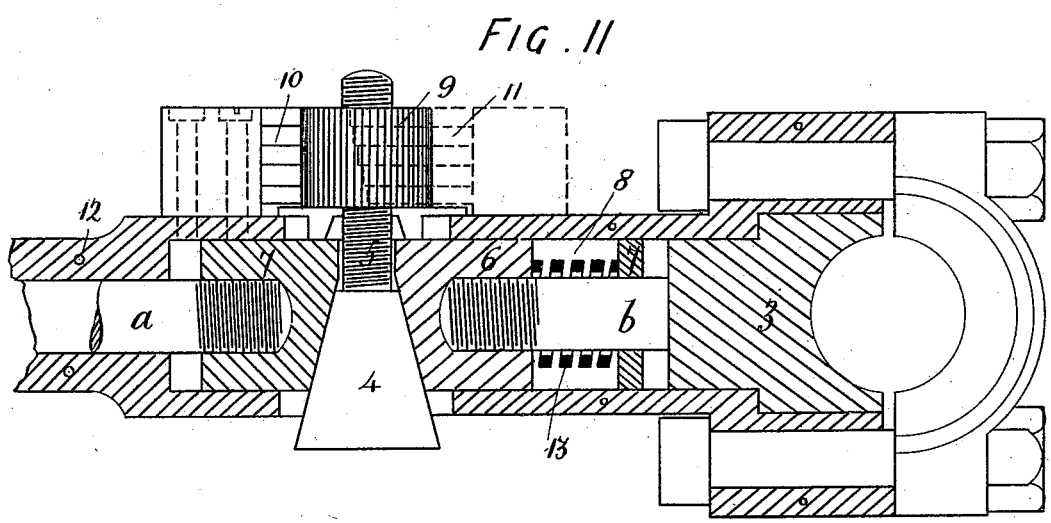

(No Model.)  7 Sheets—Sheet 6.
J. H. DALES.
AUTOMATIC ADJUSTMENT FOR BRASSES.
No. 544,213. Patented Aug. 6, 1895.
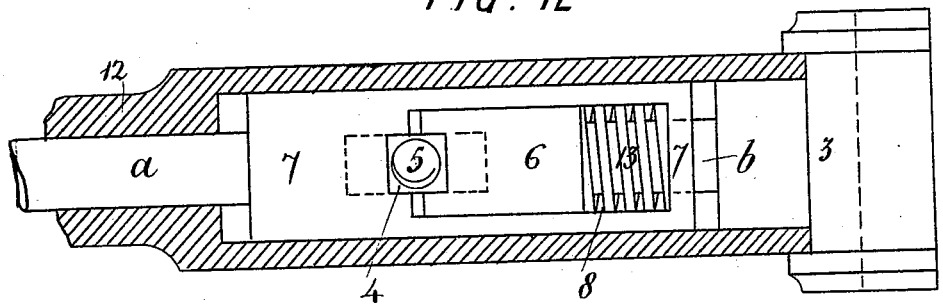
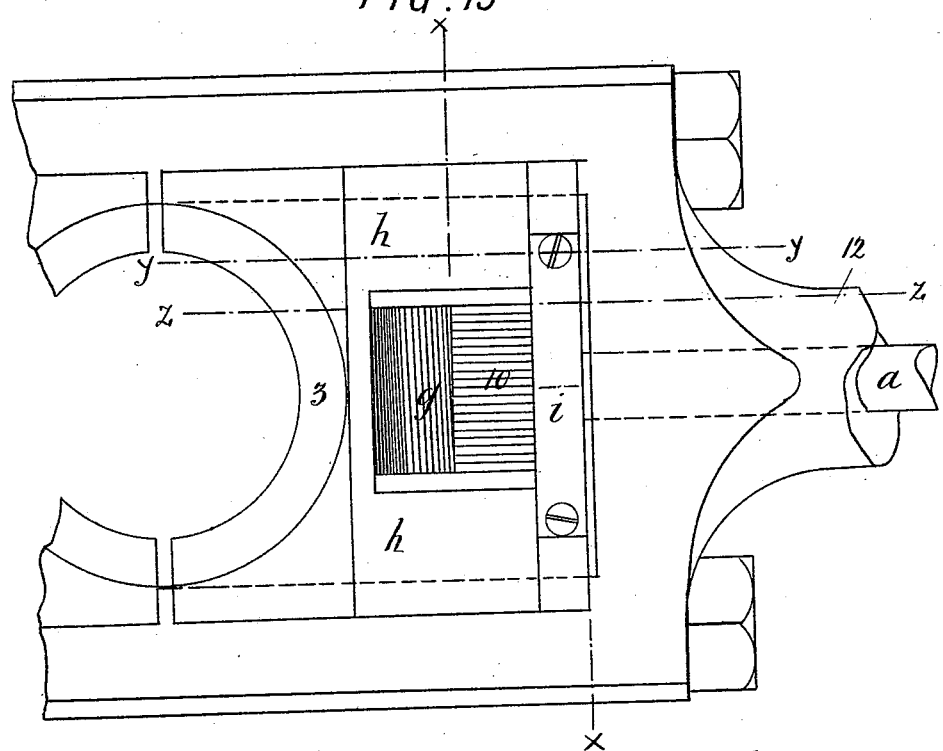
Witnesses:
G. W. Rea,
Thos. A. Green
Inventor:
John H. Dales,
By James L. Norris.
Atty.

(No Model.)  7 Sheets—Sheet 7.

J. H. DALES.
AUTOMATIC ADJUSTMENT FOR BRASSES.

No. 544,213.  Patented Aug. 6, 1895.

Witnesses:
G. W. Rea.
Thos. A. Green

Inventor:
John H. Dales,
By James L. Norris.
Atty.

UNITED STATES PATENT OFFICE.

JOHN HANDSLEY DALES, OF LEEDS, ENGLAND.

AUTOMATIC ADJUSTMENT FOR BRASSES.

SPECIFICATION forming part of Letters Patent No. 544,213, dated August 6, 1895.

Application filed June 26, 1894. Serial No. 515,780. (No model.) Patented in England April 8, 1893, No. 7,274.

*To all whom it may concern:*

Be it known that I, JOHN HANDSLEY DALES, civil engineer, a subject of the Queen of Great Britain, residing at 45 Lofthouse Place, Leeds, in the county of York, England, have invented certain new and useful Automatic Adjustments for Brasses, (for which I have obtained a patent in Great Britain, No. 7,274, bearing date April 8, 1893,) of which the following is a specification.

My invention consists in the application to the brasses of motion-bars and other reciprocating parts of machinery of devices for rendering the same self-adjusting, the power being derived from the defective action arising from the wearing of the brasses. The looseness of the brasses when worn render their contact with the pin or other gear imperfect, and the resulting motion relatively to the pin is utilized by means of pawls and ratchet-wheels in turning the bolts or nuts and tightening up the brasses.

It is advantageous to utilize the smallest possible amount of motion of the brasses relatively to the pin arising from wear of the brasses; and for this purpose I make use of double sets of pawls, each set being composed of such a number of leaves of varying lengths as to enable them to act upon the ratchet-teeth micrometrically relatively to each other; by which arrangement I am enabled to make use of ratchet-teeth of a coarse pitch.

In order that my said invention may be particularly described and ascertained reference is hereby made to the accompanying drawings, in which similar letters and numerals of reference indicate corresponding parts.

Figure 2:
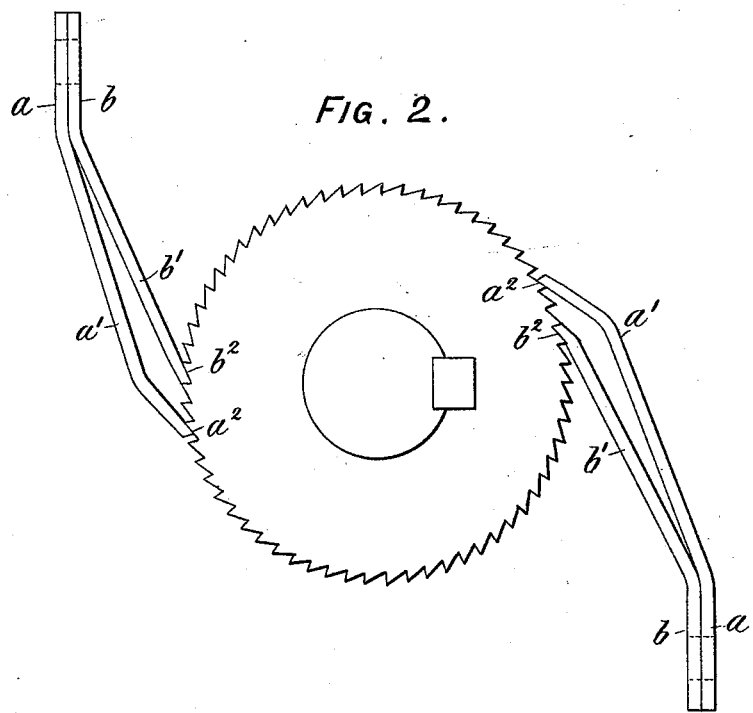

Figure 1 is an elevation of a set of ten differential spring-pawls. Fig. 2 shows the application of two sets of pawls to a ratchet-wheel. Figs. 3 to 16 are plans and sections showing the application of my invention to the ends of connecting-rods.

Referring to Figs. 1 and 2, the compound differential pawl is shown composed of two sets of leaves $a$ and $b$. The working ends of the set $a$ are lettered $a'$, and the working ends of the set $b$ are lettered $b'$. Four sets of pawls are shown in Fig. 2 in connection with the ratchet-wheel, one double set being used to drive the ratchet-wheel and the other double set acting as a detent to prevent the ratchet-wheel rotating in the wrong direction. The leaves $a'$ are shown in Fig. 2 covering half the inclined surfaces of the teeth at $a^2$, and the leaves $b'$ are shown covering the whole surfaces of the teeth at $b^2$.

Obviously any number of sets of leaves, acting upon corresponding portions of teeth of a ratchet-wheel or other equivalent device, may be used for the purposes of the invention, according to the requirements of strength and convenience.

The leaves of the pawls are of different lengths, progressing by, say, one-hundredth part of an inch, which may be treated as a minimum allowance of slackness in a bearing.

By the arrangement shown in Figs. 1 and 2, one leaf of each set of pawls engages a tooth at one time, and the remaining leaves are capable of engaging the teeth in succession, thus rendering ten to-and-fro motions of the bearing necessary to cause the ratchet-wheel to rotate to the extent of one tooth.

The action of the pawls upon the ratchet-teeth is produced by the momentum or inertia of the adjusting brass and connections or by a spring acting upon the same, and by the working force of the engine or machine operating through a distance equal to the amount of slack of the wearing parts.

The object of using a large number of leaves in the compound differential pawls is to provide for the use of a ratchet-wheel or equivalent device of coarser pitch and greater strength of tooth than would be available if smaller teeth and single pawls were used for the purposes of this invention.

Figure 3:
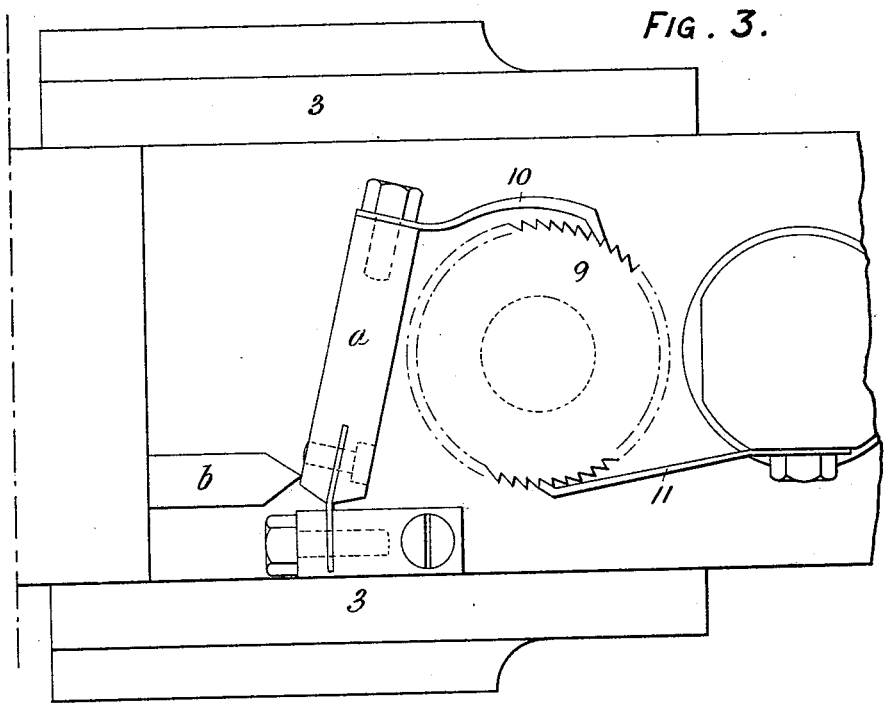

Fig. 3 shows one method of applying my invention to a connecting-rod end. $a$ is a lever hinged to the bearing-brass 3 by a thin spring, the lever being operated by a pressure-pin $b$ in contact with the bearing-brass. The lever $a$ carries a single or differential pawl 10, which acts upon a ratchet-wheel 9. This wheel is used to operate screws and wedges or other devices, as hereinafter mentioned. 11 is the stop-pawl.

Figure 4:
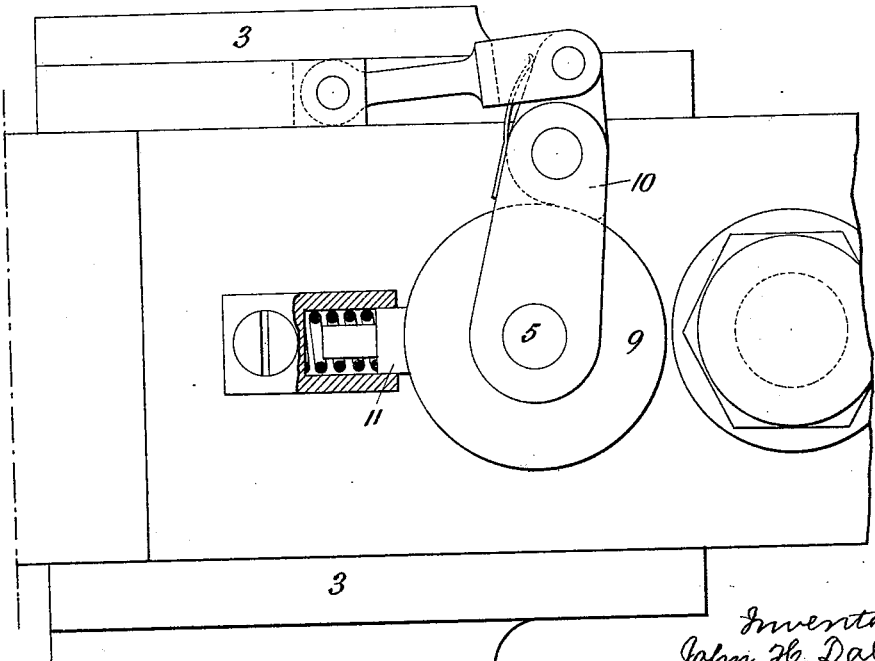

In Fig. 4 another arrangement is shown for effecting the rotation of the wheel 9, consisting of a silent feed 10 attached to a lever pivoted at 5 to the axis of the wheel 9, the lever being actuated by a connecting-link pivoted to the brass 3. 11 is a spring-brake which prevents the wheel 9 moving backward.

Figure 5:
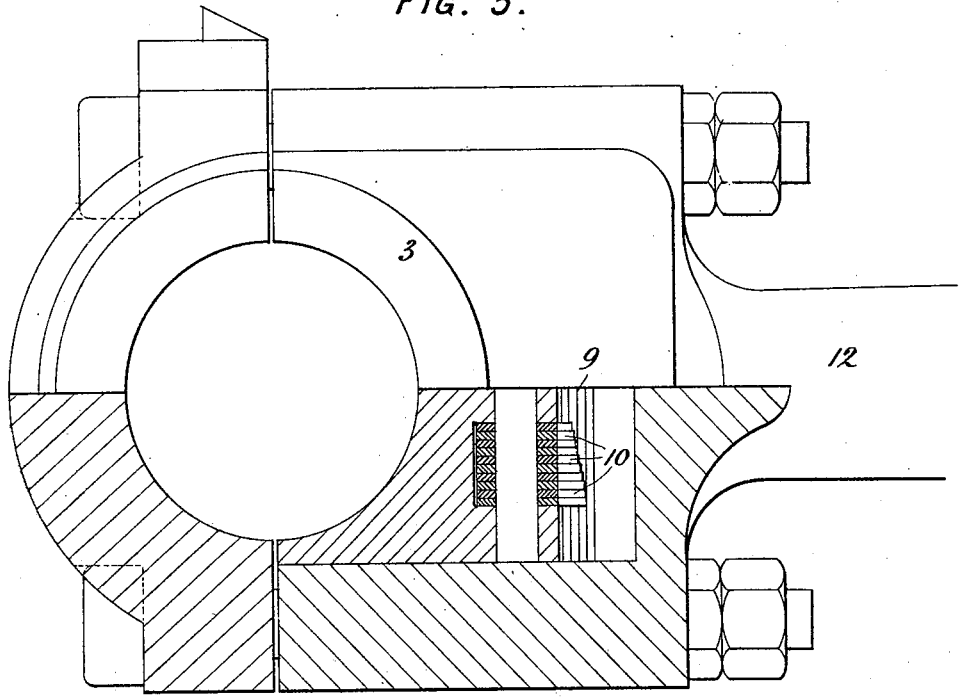
Figure 6:
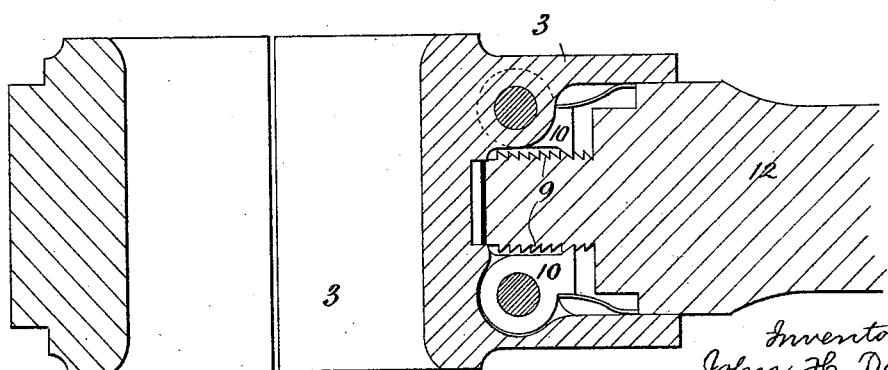

Fig. 5 is an elevation, partly in section, and Fig. 6 is a section at right angles to Fig. 5, showing a connecting-rod end fitted with automatic adjustments, according to my invention, in which the differential pawls 10 are shown to act directly upon racks 9, the racks being integral with the connecting-rod 12. This device acts without the intervention of screws, wedges, or other gear, and the pawls 10 may consist of any number of sets of leaves for strength and bearing.

Figure 7:
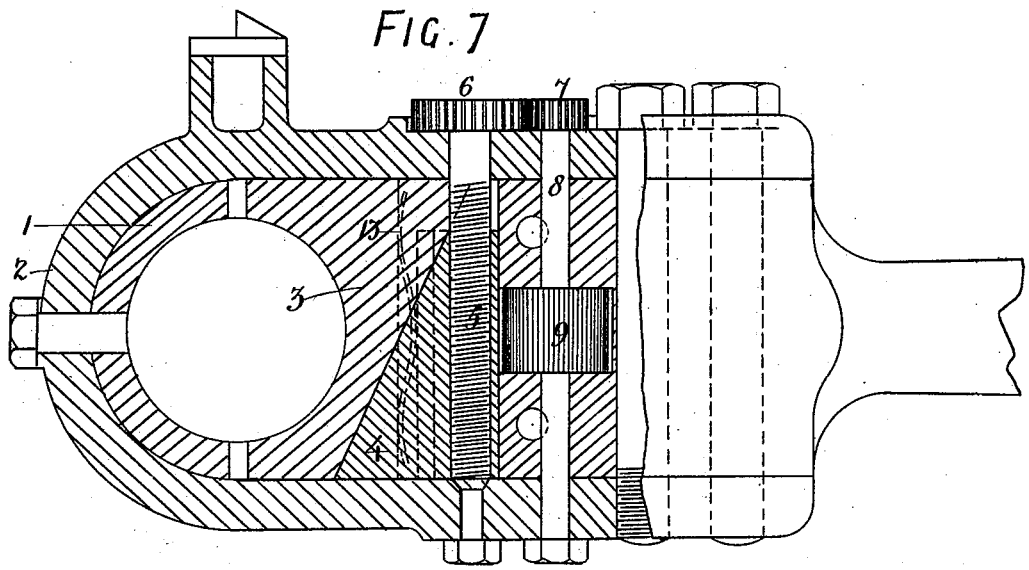
Figure 8:
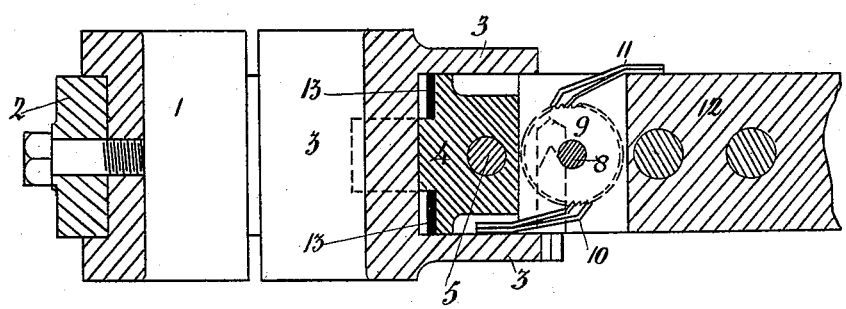

Fig. 7 is an elevation, partly in section, and Fig. 8 is a section at right angles to Fig. 7, in which the crown-brasses 1 are shown fixed to the strap 2 of the rod end, and the back brass 3 is fitted, so as to be capable of sliding in the strap. An adjusting wedge or incline 4 is made to bear upon the inclined face of the back brass 3, the position of the wedge being adjusted by the screw 5. 6 is a pinion fast on the screw-spindle 5, meshing with a pinion 7 fast on the spindle 8. 9 is a ratchet-wheel, also fast on the spindle 8. The driving-pawls 10 and the check-pawls 11 operate the ratchet-wheel 9, as shown in Fig. 8, as before described. The wedge-block 4 and the back brass 3 are kept to their work by springs 13 inserted between them, as shown in Figs. 7 and 8. When any slackness takes place in the brasses the springs give way to a sufficient extent to enable the pawls to operate the wheel 9, and thereby tighten the wedge 4.

A device for operating the crown-brass instead of the back brass is shown in Figs. 9 and 10, wherein the reciprocating movement of the differential adjusting-pawl 10 is obtained by a pin or slide $a$ passing through the cap $b$. The differential adjusting-pawl 10 is fixed to the pin $a$, actuating the movement of the ratchet-wheel $g$ (integral with the spindle $f$) in the direction of the arrow. At the ends of the spindle $f$ are worms $f'$, integral with the spindle and meshing with worm-pinions $e$. These pinions are bored and tapped to gear with the screw-threads of the bolts $d$, which are prevented from turning by suitable keys. The end of the slide $a$ is pressed inward by a spring $c$, the ends of which engage under the end nuts of the bolts $d$. The check-pawls 11 are bolted to the pin $a$.

Figs. 11 and 12 illustrate the application of my invention to a connecting-rod, in which one set of adjusting appliances operate the back brasses at both ends of the rod, the means of adjustment being placed preferably near the small or gudgeon eye of the rod and transmitted to the big end of the rod by a pressure-rod $a$, passing through a hole in the center of the connecting-rod 12. The arrangement consists of a wedge 4 having a screwed shank 5, on which a ratchet-wheel nut 9 is mounted to draw the wedge. The ratchet-wheel nut is caused to revolve by two sets of differential pawls 10 and 11, both mounted on the body of the rod 12. Both the pawls in turn actuate the ratchet-wheel nut 9 and act as stop-pawls. The wedge acts upon two blocks 6 and 7, to which the pressure-rods $b$ and $a$ are fitted. The wedge is retained in contact with the blocks 6 and 7 by the spring 13.

Figure 14:
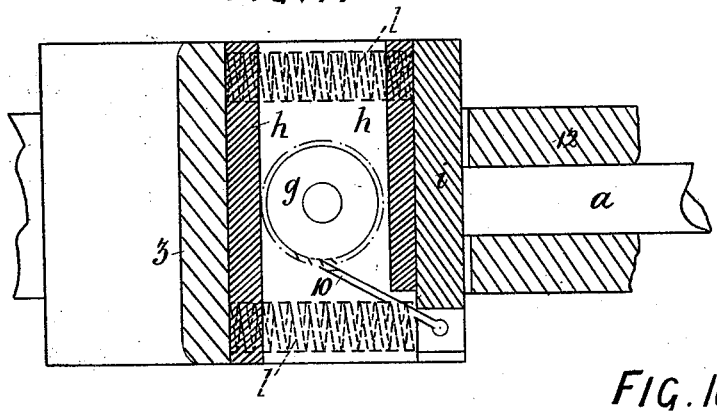
Figure 15:
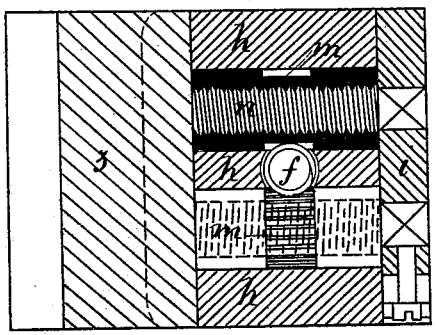
Figure 16:
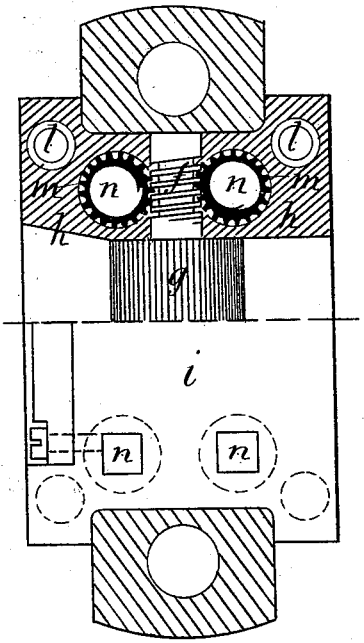

Figs. 13, 14, 15, and 16 show an arrangement of my invention in which the mechanism is fitted up in a block $h$, which is slipped into the jaw of the big end before the brasses are put in, Figs. 14, 15, and 16 being sections on the lines $z\, z$, $y\, y$, and $x\, x$ of Fig. 13. The pawls 10 are fitted to the edge of a thick plate $i$, which is placed in the jaw before the block is put in. Springs $l$ are placed in the ratchet-block $h$ to separate it from the pawl-plate $i$ and to utilize the pulsation arising from the working of the engine. The adjustment is effected by the pawls 10 turning the ratchet-wheel $g$ and the ratchet-spindle $f$ revolving the worm-wheel barrel-nuts $m$, which contain screws $n$, the heads of which are prevented from turning round by squares fitting in holes in the pawl-plate $i$, the effect of the arrangement being to separate the block $h$ from the pawl-plate $i$, the adjustment of the small end being effected by the plate $i$ being in contact with the rod $a$, passing through the connecting-rod 12 to the back brass of the small end, thus automatically taking up the wear at both ends of the connecting-rod.

In any case in engine practice in which a continuous automatic adjustment is for any reason undesirable, intermittent adjustment may be brought about by using any of the aforesaid modifications in connection with a star-wheel or any similar device, which may be operated by a movable stop or piece placed in position by hand in the course or run of such star-wheel in such manner that the star-wheel or piece may be actuated for the purpose of adjustment.

In Figs. 7 and 8 the ratchet-wheel 9 is shown inclosed and acting through gear-wheels 6 and 7 and screw 5. This may be modified in many ways. For instance, in some cases I place the ratchet-wheel outside and mounted on the screw-spindle 5 direct without the intervention of gear-wheels, the pawls 10 and 11 being suitably attached to the brass 3 and connecting rod, strap, or bolt, respectively. This may be further modified by increasing the amount of movement of the pawl 10 by means of a lever pivoted at its lower end to the strap and acting between the brass 3 and wedge-piece 4 and working a slide carrying the pawl 10 at its upper end.

Although I have illustrated my invention as applied to connecting-rods only, I wish it to be understood that it is equally applicable to all parts of machinery where adjustments are required, including links, plummer-blocks, slide blocks, and motion blocks generally.

Having described my invention, what I claim is—

1. In a self adjusting bearing, the combination with an adjustable portion of the bearing, of a ratchet wheel, a pawl engaging said ratchet wheel and adapted to be vibrated by the lost motion of said adjustable portion of the bearing, a pawl for preventing backward movement of said ratchet wheel, and mechanism actuated by the said ratchet wheel for tightening the bearing for taking up wear, substantially as described.

2. In a self adjusting bearing, the combination with an adjustable portion of the bearing, of a ratchet wheel, a series of pawls of varying lengths engaging said ratchet wheel and adapted to be vibrated by the lost motion of said adjustable portion of the bearing, means for preventing the backward movement of the ratchet wheel, and mechanism actuated by the said ratchet wheel for tightening the bearing for taking up wear, substantially as described.

Dated this 25th day of May, 1894.

JOHN HANDSLEY DALES.

Witnesses:
HENRY DENTON,
JOHN LAWRANCE.